(12) United States Patent
Schmidt

(10) Patent No.: US 8,719,833 B2
(45) Date of Patent: May 6, 2014

(54) ADAPTIVE DEMAND-DRIVEN LOAD BALANCING

(75) Inventor: Olaf Schmidt, Walldorf (DE)

(73) Assignee: SAP AG, Walldorf (DE)

( * ) Notice: Subject to any disclaimer, the term of this patent is extended or adjusted under 35 U.S.C. 154(b) by 435 days.

(21) Appl. No.: 12/822,816

(22) Filed: Jun. 24, 2010

(65) Prior Publication Data

US 2011/0321058 A1 Dec. 29, 2011

(51) Int. Cl.
*G06F 9/46* (2006.01)

(52) U.S. Cl.
USPC ............................. 718/105; 718/102; 718/104

(58) Field of Classification Search
USPC ........................................ 718/105, 102, 104
See application file for complete search history.

(56) References Cited

U.S. PATENT DOCUMENTS

| | | | |
|---|---|---|---|
| 6,889,243 B1 * | 5/2005 | Hondou et al. | 718/100 |
| 7,509,646 B1 * | 3/2009 | Maw et al. | 718/105 |
| 8,108,258 B1 * | 1/2012 | Slattery et al. | 705/19 |
| 8,136,114 B1 * | 3/2012 | Gailloux et al. | 718/104 |
| 2002/0073129 A1 * | 6/2002 | Wang et al. | 709/102 |
| 2006/0167836 A1 * | 7/2006 | Chatterjee et al. | 707/2 |
| 2008/0052714 A1 * | 2/2008 | Wong | 718/102 |
| 2008/0154977 A1 | 6/2008 | Schmidt | |
| 2008/0154994 A1 | 6/2008 | Fischer et al. | |
| 2008/0172595 A1 | 7/2008 | Schmidt | |
| 2008/0243781 A1 | 10/2008 | Kuhr et al. | |
| 2008/0263007 A1 | 10/2008 | Schmidt | |
| 2009/0150168 A1 | 6/2009 | Schmidt | |
| 2009/0150431 A1 | 6/2009 | Schmidt et al. | |
| 2009/0150866 A1 | 6/2009 | Schmidt | |
| 2009/0150906 A1 | 6/2009 | Schmidt et al. | |

OTHER PUBLICATIONS

U.S. Appl. No. 12/435,690, filed May 5, 2009 entitled "System, Method, and Software for Controlled Interruption of Batch Job Processing".

* cited by examiner

*Primary Examiner* — Diem Cao
(74) *Attorney, Agent, or Firm* — Fish & Richardson P.C.

(57) ABSTRACT

The present disclosure involves systems, software, and computer implemented methods for providing adaptive demand-driven load balancing for processing jobs in business applications. One process includes operations for identifying a workload for distribution among a plurality of work processes. A subset of the workload is assigned to a plurality of work processes for processing of the subset of the workload based on an application-dependent algorithm. An indication of availability is received from one of the plurality of work processes, and a new subset of the workload is assigned to the work process.

23 Claims, 4 Drawing Sheets

ADAPTIVE DEMAND-DRIVEN LOAD BALANCING

TECHNICAL FIELD

The present disclosure relates to software, computer systems, and computer implemented methods for providing adaptive demand-driven load balancing for processing jobs in business applications.

BACKGROUND

When processing large amounts of data, business applications may process the data in batch jobs. The business applications can, for example, implement batch processing by grouping a sequence of commands to be executed within a single file or unit and executing the commands at a particular time within a given time period. Examples of batch processing include print jobs for accounting or processing pay slips at the end of a month. Batch jobs can be time-critical and may need to be finished in short time frames. Accordingly, the batch jobs may need to be implemented efficiently across multiple data processors, or work processes. For example, multiple computer processors or multiple servers can be used in parallel to efficiently execute one or more processing jobs. In some instances, a load balancing mechanism can be used to distribute the workload of the processing jobs evenly across the different processors.

Load balancing can be implemented statically at a centralized load balancer, which can divide the total workload into smaller work packages of fixed size before assigning the work packages to the available work processes. The static distribution of workload, however, may result in inefficient processing and utilization of hardware. For example, work packages of the same size do not necessarily have the same computational complexity. A centralized load balancer may not recognize the varying degrees of complexity within an overall workload or the computational resources required to process a particular work package. For example, a load balancer may be used to distribute processing of invoices of a large number of a customers. The total number of invoices may be divided by the load balancer into smaller, equally-sized packages of invoices for processing. Each individual invoice, however, may contain a different number of items and may require different processing times. Accordingly, the load balancer may divide the invoices into work packages that could potentially result in certain work packages requiring significantly more computational resources than others. When work packages of varying complexity are processed by several work processes, the utilization of the work processes may be inefficient when some work processes complete their tasks sooner than others.

In some implementations, load balancers can account for varying complexities in work packages by analyzing the workload and estimating the processing requirements for each work package. The load balancers can then distribute work packages of different sizes to compensate for the differences in complexity of the work packages. Load balancers that analyze a workload, however, may require additional processing time and may become a bottleneck in a batch process. Further, load balancers may require specific knowledge of a particular application or domain in order to estimate the complexity of individual work items.

SUMMARY

The present disclosure provides techniques for providing adaptive demand-driven load balancing for processing jobs in business applications. A computer program product is encoded on a tangible storage medium, where the product comprises computer readable instructions for causing one or more processors to perform operations. These operations can include identifying a workload for distribution among a plurality of work processes. A subset of the workload is assigned to a plurality of work processes for processing of the subset of the workload based on an application-dependent algorithm. An indication of availability is received from one of the plurality of work processes that has completed processing of a particular work package of the subset of the workload assigned to the particular work process, and a new subset of the workload is assigned to the work process in response to receiving the indication of availability.

While generally described as computer implemented software embodied on tangible media that processes and transforms the respective data, some or all of the aspects may be computer implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DETAILED DESCRIPTION

Figure 1:
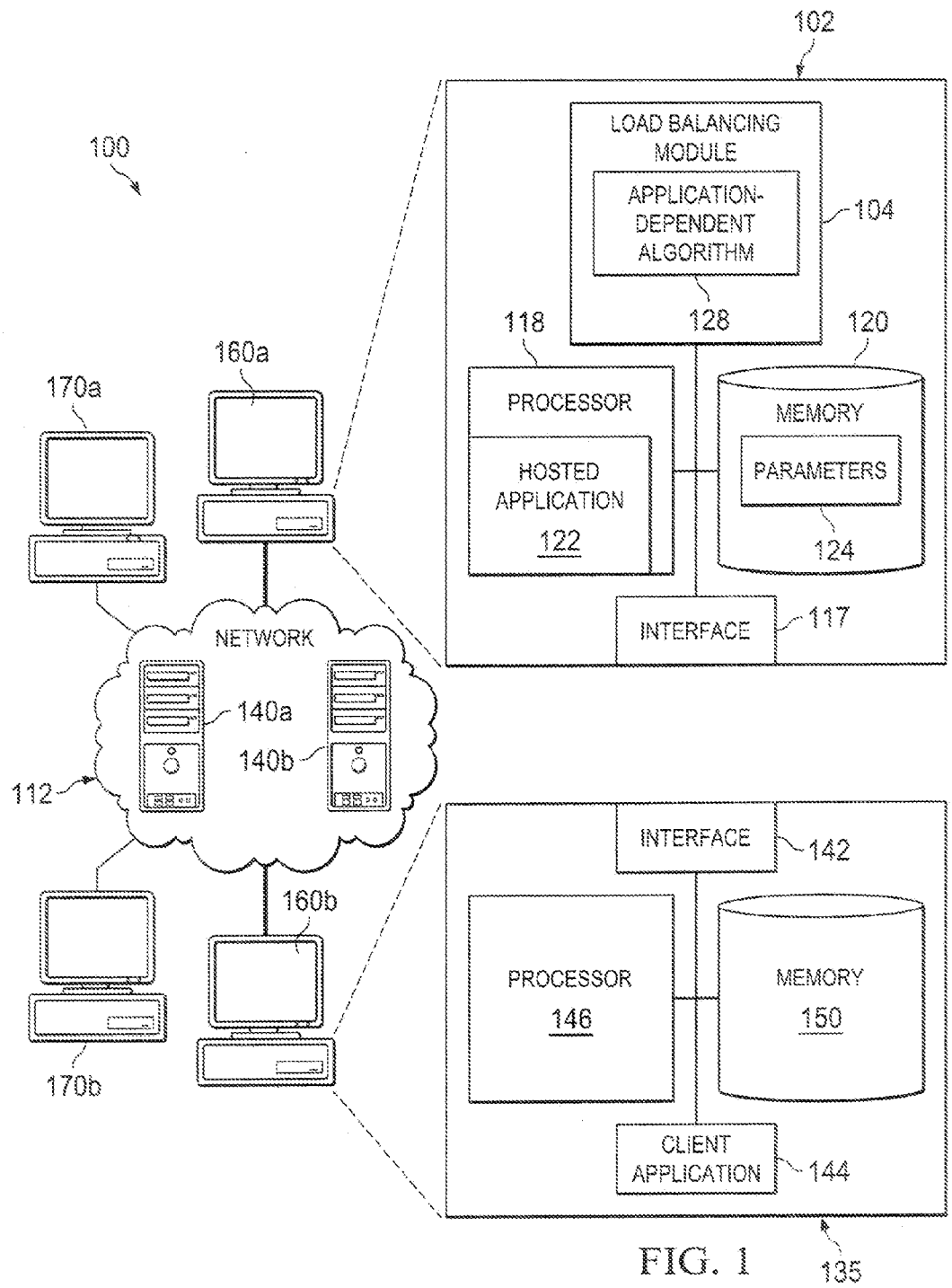
FIG. 1 illustrates an example environment implementing various features of adaptive demand-driven load balancing for processing jobs in business applications.

This disclosure generally describes computer systems, software, and computer implemented methods for providing adaptive demand-driven load balancing for processing jobs in business applications. Business applications may be associated with large amounts of data that require processing across multiple data processors. The data may comprise work items of varying degrees of complexity, however, and each work item may require different processing times. A particular workload that is distributed evenly across multiple processors based on size may nonetheless result in certain processors completing processing long before other processors due to the differences in complexity of the work items. A generic, adaptive load balancing implementation can be used to distribute work items on demand in an efficient manner based on parameters that account for estimated differences in work item complexity for different business applications and other factors associated with load balancing of work items.

For example, instead of dividing and assigning an entire workload to available processors in one iteration, a subset of the workload may initially be assigned to the multiple processors based on an algorithm that accounts for possible differences in processing times of different work items in the subset of the workload. The remaining, unassigned portions of the workload may then be distributed over time as different processors complete their tasks in different orders. Thus, a centralized load balancer can distribute work items to a plurality of processors based on estimated variations in processing times for a given business application or context as well as in accordance with actual differences in processing times at runtime. Additionally, other factors may be considered while assigning work items to processors such as differences in processing capabilities among the processors or differences in priority of individual work items. Accordingly, an adaptive demand-driven load balancing implementation for processing jobs in business applications can be provided as described in the present disclosure.

One potential benefit of the adaptive demand-driven load balancing implementation of the present disclosure is that hardware used for distributed processing, such as processors, servers, or workstations, can be utilized in an efficient manner. In some implementations, a load balancer may distribute work items of equal size to a plurality of processors. The equal-sized work items may each require different processing times, however, due to differences in complexity among the different work items. Thus, in certain load balancing situations, some processors may remain idle after completing processing of a work item while other processors continue to process data, resulting in inefficient utilization of processors.

The load balancing mechanism of the present disclosure, however, initially assigns only a subset of an overall workload to a plurality of processors. The subset of the workload can be divided into work packages that are each assigned to a different processor based on an application-dependent algorithm. In some implementations, each work package may consist of individual work items, which may be individual tasks or jobs to be performed by the processors. The application-dependent algorithm can help the load balancer assign work items to processors in a manner that accounts for estimated deviations in processing times of different work items. The application-dependent algorithm can be based on an analysis of statistical data or historical performance of work items associated with particular business applications. Thus, the load balancer can distribute the workload efficiently without analyzing the content of the workload, which would require additional processing resources and could result in unnecessary bottlenecks at the load balancer, and without requiring extensive domain-specific knowledge or modification of the business application. Further, since only a subset of an overall workload is initially distributed, the load balancer can distribute the remaining portions of the workload on an on-demand basis according to the present need of the processors. Thus, the load balancer can dynamically adapt to the changing needs of the processors or the workload. Accordingly, downtimes in the processors may be reduced, and a workload may be efficiently distributed to processors.

Turning to the illustrated example, FIG. 1 illustrates an example environment 100 for providing adaptive demand-driven load balancing for processing jobs in business applications. The illustrated environment 100 includes or is communicably coupled with server 102 and one or more clients 135, at least some of which communicate across network 112. In general, environment 100 depicts an example configuration of a system capable of providing adaptive demand-driven load balancing. The environment 100 also supports one or more servers 140 operable to provide a set of services to the client 135 or server 102 in which the one or more servers 140 can be logically grouped and accessible within a cloud computing network. Accordingly, the adaptive demand-driven load balancing solution may be provided to a client 135 or server 102 as an on-demand solution through the cloud computing network or as a traditional server-client system.

In general, server 102 is any server that stores one or more hosted applications 122, where at least a portion of the hosted applications 122 are executed via requests and responses sent to users or clients within and communicably coupled to the illustrated environment 100 of FIG. 1. For example, server 102 may be a Java 2 Platform, Enterprise Edition (J2EE)-compliant application server that includes Java technologies such as Enterprise JavaBeans (EJB), J2EE Connector Architecture (JCA), Java Messaging Service (JMS), Java Naming and Directory Interface (JNDI), and Java Database Connectivity (JDBC). In some instances, the server 102 may store a plurality of various hosted applications 122, while in other instances, the server 102 may be a dedicated server meant to store and execute only a single hosted application 122. In some instances, the server 102 may comprise a web server or be communicably coupled with a web server, where the hosted applications 122 represent one or more web-based applications accessed and executed via network 112 by the clients 135 of the system to perform the programmed tasks or operations of the hosted application 122.

At a high level, the server 102 comprises an electronic computing device operable to receive, transmit, process, store, or manage data and information associated with the environment 100. The server 102 illustrated in FIG. 1 can be responsible for receiving application requests from one or more client applications 144 or business applications associated with the clients 135 of environment 100 and responding to the received requests by processing said requests in the associated hosted application 122, and sending the appropriate response from the hosted application 122 back to the requesting client application 144. Alternatively, the hosted application 122 at server 102 can be capable of processing and responding to local requests from a user accessing server 102 locally. Accordingly, in addition to requests from the external clients 135 illustrated in FIG. 1, requests associated with the hosted applications 122 may also be sent from internal users, external or third-party customers, other automated applications, as well as any other appropriate entities, individuals, systems, or computers. Further, the terms "client application" and "business application" may be used interchangeably as appropriate without departing from the scope of this disclosure.

As used in the present disclosure, the term "computer" is intended to encompass any suitable processing device. For example, although FIG. 1 illustrates a single server 102, environment 100 can be implemented using two or more servers 102, as well as computers other than servers, including a server pool. Indeed, server 102 may be any computer or processing device such as, for example, a blade server, general-purpose personal computer (PC), Macintosh, workstation, UNIX-based workstation, or any other suitable device. In other words, the present disclosure contemplates computers other than general purpose computers, as well as computers without conventional operating systems. Further, illustrated server 102 may be adapted to execute any operating system, including Linux, UNIX, Windows, Mac OS, or any other suitable operating system. According to one embodiment, server 102 may also include or be communicably coupled with a mail server.

In the present implementation, and as shown in FIG. 1, the server 102 includes a processor 118, an interface 117, a memory 120, one or more hosted applications 122, and a load balancing module 104. The interface 117 is used by the server 102 for communicating with other systems in a client-server or other distributed environment (including within environment 100) connected to the network 112 (e.g., client 135, as well as other systems communicably coupled to the network 112). Generally, the interface 117 comprises logic encoded in software and/or hardware in a suitable combination and operable to communicate with the network 112. More specifically, the interface 117 may comprise software supporting one or more communication protocols associated with communications such that the network 112 or interface's hardware is operable to communicate physical signals within and outside of the illustrated environment 100.

The server 102 may also include a user interface, such as a graphical user interface (GUI) 160a. The GUI 160a comprises a graphical user interface operable to, for example, allow the user of the server 102 to interface with at least a portion of the platform for any suitable purpose, such as creating, preparing, requesting, or analyzing data, as well as viewing and accessing source documents associated with business transactions. Generally, the GUI 160a provides the particular user with an efficient and user-friendly presentation of business data provided by or communicated within the system. The GUI 160a may comprise a plurality of customizable frames or views having interactive fields, pull-down lists, and buttons operated by the user. For example, GUI 160a may provide interactive elements that allow a user to select from a list of suggested entries for input into a data field displayed in GUI 160a. GUI 160a may also display suggestions of possible actions or links to processes that may be beneficial to a user. More generally, GUI 160a may also provide general interactive elements that allow a user to access and utilize various services and functions of application 122. The GUI 160a is often configurable, supports a combination of tables and graphs (bar, line, pie, status dials, etc.), and is able to build real-time portals, where tabs are delineated by key characteristics (e.g. site or micro-site). Therefore, the GUI 160a contemplates any suitable graphical user interface, such as a combination of a generic web browser, intelligent engine, and command line interface (CLI) that processes information in the platform and efficiently presents the results to the user visually.

Generally, example server 102 may be communicably coupled with a network 112 that facilitates wireless or wireline communications between the components of the environment 100 (i.e., between the server 102 and client 135 as well as between servers 140 and 102 or workstations 170), as well as with any other local or remote computer, such as additional clients, servers, or other devices communicably coupled to network 112 but not illustrated in FIG. 1. In the illustrated environment, the network 112 is depicted as a single network in FIG. 1, but may be a continuous or discontinuous network without departing from the scope of this disclosure, so long as at least a portion of the network 112 may facilitate communications between senders and recipients. The network 112 may be all or a portion of an enterprise or secured network, while in another instance at least a portion of the network 112 may represent a connection to the Internet. In some instances, a portion of the network 112 may be a virtual private network (VPN), such as, for example, the connection between the client 135 and the server 102. Further, all or a portion of the network 112 can comprise either a wireline or wireless link. Example wireless links may include 802.11a/b/g/n, 802.20, WiMax, and/or any other appropriate wireless link. In other words, the network 112 encompasses any internal or external network, networks, sub-network, or combination thereof operable to facilitate communications between various computing components inside and outside the illustrated environment 100. The network 112 may communicate, for example, Internet Protocol (IP) packets, Frame Relay frames, Asynchronous Transfer Mode (ATM) cells, voice, video, data, and other suitable information between network addresses. The network 112 may also include one or more local area networks (LANs), radio access networks (RANs), metropolitan area networks (MANs), wide area networks (WANs), all or a portion of the Internet, and/or any other communication system or systems at one or more locations. The network 112, however, is not a required component of the present disclosure.

As illustrated in FIG. 1, server 102 includes a processor 118. Although illustrated as a single processor 118 in FIG. 1, two or more processors may be used according to particular needs, desires, or particular embodiments of environment 100. Each processor 118 may be a central processing unit (CPU), a blade, an application specific integrated circuit (ASIC), a field-programmable gate array (FPGA), or another suitable component. Generally, the processor 118 executes instructions and manipulates data to perform the operations of server 102 and, specifically, the one or more plurality of hosted applications 122. Specifically, the server's processor 118 executes the functionality required to receive and respond to requests from the clients 135 and their respective client applications 144, as well as the functionality required to perform the other operations of the hosted application 122.

Regardless of the particular implementation, "software" may include computer-readable instructions, firmware, wired or programmed hardware, or any combination thereof on a tangible medium operable when executed to perform at least the processes and operations described herein. Indeed, each software component may be fully or partially written or described in any appropriate computer language including C, C++, Java, Visual Basic, assembler, Perl, any suitable version of 4GL, as well as others. It will be understood that while portions of the software illustrated in FIG. 1 are shown as individual modules that implement the various features and functionality through various objects, methods, or other processes, the software may instead include a number of sub-modules, third party services, components, libraries, and such, as appropriate. Conversely, the features and functionality of various components can be combined into single components as appropriate. In the illustrated environment 100, processor 118 executes one or more hosted applications 122 on the server 102.

At a high level, each of the one or more hosted applications 122 is any application, program, module, process, or other software that may execute, change, delete, generate, or otherwise manage information according to the present disclosure, particularly in response to and in connection with one or more requests received from the illustrated clients 135 and their associated client applications 144. In certain cases, only one hosted application 122 may be located at a particular server 102. In others, a plurality of related and/or unrelated hosted applications 122 may be stored at a single server 102, or located across a plurality of other servers 102, as well. In certain cases, environment 100 may implement a composite hosted application 122. For example, portions of the composite application may be implemented as Enterprise Java Beans (EJBs) or design-time components may have the ability to generate run-time implementations into different platforms, such as J2EE (Java 2 Platform, Enterprise Edition), ABAP (Advanced Business Application Programming) objects, or Microsoft's .NET, among others. Additionally, the hosted applications 122 may represent web-based applications accessed and executed by remote clients 135 or client applications 144 via the network 112 (e.g., through the Internet). Further, while illustrated as internal to server 102, one or more processes associated with a particular hosted application 122 may be stored, referenced, or executed remotely. For example, a portion of a particular hosted application 122 may be a web service associated with the application that is remotely called, while another portion of the hosted application 122 may be an interface object or agent bundled for processing at a remote client 135. Moreover, any or all of the hosted applications 122 may be a child or sub-module of another software module or enterprise application (not illustrated) without departing from the scope of this disclosure. Still further, portions of the hosted application 122 may be executed by a user working directly at server 102, as well as remotely at client 135.

As illustrated, processor 118 can also execute a load balancing module 104 that provides services for applications such as hosted application 122 or client application 144. In some implementations, the load balancing module 104 can be executed by a different processor or server external to server 102, such as by a server communicably coupled to server 102 through network 112. For example, the load balancing module 104 may be provided as an on-demand service through a cloud computing network, as a web service accessible via network 112, or as a service provided on a dedicated server. The load balancing module 104 can provide interfaces, modules, services, or metadata definitions that enable hosted application 122 or client application 144 to distribute a workload among a plurality of work processes for distributed processing. In the present disclosure, a work process may be any computer program, computer microprocessor, server, workstation, instance of a computer program, thread of execution within a computer program, or other data processing element used by load balancing module 104 to process data. Examples of work processes used by load balancing module 104 may include processor 118, other workstations 170 communicably coupled with server 102, or servers and/or services available through a cloud network such as servers 140a-b.

In particular, a business application such as client application 144 or hosted application 122 may need to process large amounts of data within a short period of time. The business application may transmit the large amounts of data to the load balancing module 104 for distribution among multiple work processes for concurrent processing. The workload received by the load balancing module 104 may consist of a plurality of individual work items. The load balancing module 104 may divide the workload evenly among a fixed number of work processes such that each work process receives the same number of work items for processing, or the load balancing module 104 may assign different amounts of work items to different work processes. Work processes that are assigned equal amounts of work items, however, may still require different processing times due to differences in complexity of the assigned work items. Accordingly, some work processes may complete processing of assigned work items much sooner than other work processes, despite the even distribution of work items among work processes.

The load balancing module 104 may assign work items using an application-dependent algorithm 128 to determine appropriate amounts of data to assign to each work process to maximize the efficiency of available work processes. The application-dependent algorithm 128 may be any algorithm, software, or mathematically-based tool that can provide a quantifiable suggestion for how to distribute a workload among a plurality of work processes that maximizes utilization of the plurality of work processes. Certain parameters 124 can be used by the application-dependent algorithm 128 to determine a solution for distributing a workload, such as parameters specific to a particular domain or business application that reflect processing attributes of work items associated with the particular business application. In the illustrated example, the parameters 124 can be stored in memory 120 on server 102.

The load balancing module 104 may be separate from hosted application 122, while in other instances, the load balancing module 104 may be embedded within or part of a particular one or more hosted applications. In some instances, hosted application 122 may be communicably coupled to the load balancing module 104, allowing hosted application 122 to access and take advantage of the functionality provided by the load balancing module 104. One example of an implementation of the load balancing module 104 is described in detail below in connection with FIG. 4. Through analysis of empirical data associated with work item processing times in a particular business context, the load balancing module 104 can execute a load balancing process that minimizes idle times at the available work processes. The functionality provided by the load balancing module 104 can also include adaptive features responsive to particular demands of a current load balancing process. For example, the application-dependent algorithm 128 may be updated or adapted during runtime as additional data is obtained related to processing of work items is obtained. The load balancing module 1-4 may also assign work items to work processes in an order based on relative priority of particular work items or work processes. Additionally, the load balancing module 104 may increase or decrease the number of work processes utilized during load balancing as well as accept additional work items for processing during runtime, depending on the need. In other words, the scope of the present disclosure includes an adaptive load balancing module 104 that can modify any element within the load balancing process in response to changing parameters within the process.

In general, the server 102 also includes memory 120 for storing data and program instructions. Memory 120 may include any memory or database module and may take the form of volatile or non-volatile memory including, without limitation, magnetic media, optical media, random access memory (RAM), read-only memory (ROM), removable media, or any other suitable local or remote memory component. Memory 120 may store various objects or data, including classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the server 102 and its one or more hosted applications 122.

Memory 120 may also store data objects such as parameters 124 used by the load balancing module 104. For example, the differences in processing times for different work items may depend on a context of the particular business application associated with the work items. A parameter reflecting application-specific attributes may be used to estimate the differences in processing times for work items. The processing times may be estimated based on statistical analysis of a history of processing times associated with similar work items or processing jobs associated with the business application. In some instances, the statistical analysis considers only the performance of particular systems and does not analyze the content of the work items. Other types of parameters 124 for estimating possible processing times for each work item may be stored in memory 120 such as other mathematical or statistics-based representations. Still further, memory 120 may include any other appropriate data, such as VPN applications, firmware logs and policies, HTML files, data classes or object interfaces, unillustrated software applications or sub-systems, firewall policies, a security or access log, print or other reporting files, as well as others.

The illustrated environment of FIG. 1 also includes one or more clients 135. Each client 135 may be any computing device operable to connect to or communicate with at least the server 102 and/or via the network 112 using a wireline or wireless connection. Further, as illustrated in FIG. 1, client 135 includes a processor 146, an interface 142, a graphical user interface (GUI) 160b, a client application 144, and a memory 150. In general, client 135 comprises an electronic computer device operable to receive, transmit, process, and store any appropriate data associated with the environment 100 of FIG. 1. It will be understood that there may be any number of clients 135 associated with, or external to, environment 100. For example, while illustrated environment 100 includes one client 135, alternative implementations of environment 100 may include multiple clients communicably coupled to the server 102, or any other number of clients suitable to the purposes of the environment 100. Additionally, there may also be one or more additional clients 135 external to the illustrated portion of environment 100 that are capable of interacting with the environment 100 via the network 112. Further, the term "client" and "user" may be used interchangeably as appropriate without departing from the scope of this disclosure. Moreover, while each client 135 is described in terms of being used by a single user, this disclosure contemplates that many users may use one computer, or that one user may use multiple computers.

As used in this disclosure, client 135 is intended to encompass a personal computer, touch screen terminal, workstation, network computer, kiosk, wireless data port, smart phone, personal data assistant (PDA), one or more processors within these or other devices, or any other suitable processing device. For example, each client 135 may comprise a computer that includes an input device, such as a keypad, touch screen, mouse, or other device that can accept user information, and an output device that conveys information associated with the operation of the server 102 (and hosted application 122) or the client 135 itself, including digital data, visual information, the client application 144, or the GUI 160b. Both the input and output device may include fixed or removable storage media such as a magnetic storage media, CD-ROM, or other suitable media to both receive input from and provide output to users of client 135 through the display, namely, the GUI 160b.

While FIG. 1 is described as containing or being associated with a plurality of elements, not all elements illustrated within environment 100 of FIG. 1 may be utilized in each alternative implementation of the present disclosure. For example, although FIG. 1 depicts a server-client environment implementing a hosted application at server 102 that can be accessed by client computer 135, in some implementations, server 102 executes a local application that features an application UI accessible to a user directly utilizing GUI 160a. Further, although FIG. 1 depicts a server 102 external to network 112 while other servers 140 are within the network 112, server may be included within the network 112 as part of a cloud network load balancing solution, for example. Additionally, one or more of the elements described herein may be located external to environment 100, while in other instances, certain elements may be included within or as a portion of one or more of the other described elements, as well as other elements not described in the illustrated implementation. Further, certain elements illustrated in FIG. 1 may be combined with other components, as well as used for alternative or additional purposes in addition to those purposes described herein.

Figure 2:
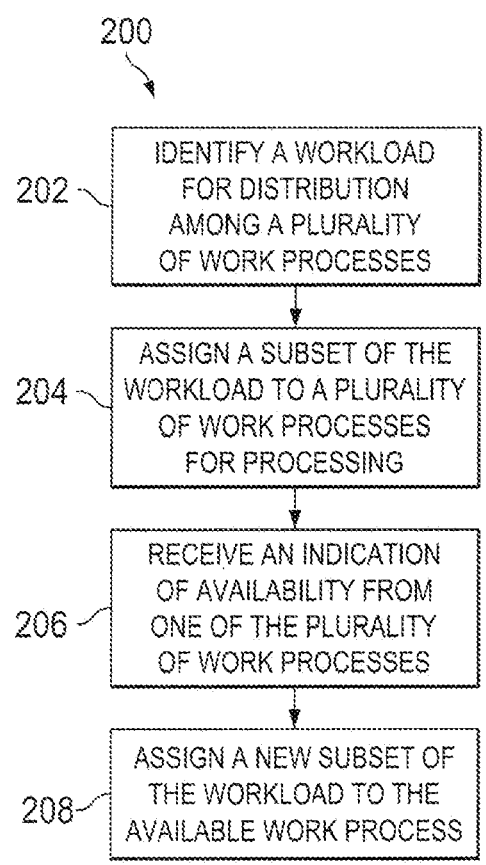
FIG. 2 is a flow chart of an example process for providing adaptive demand-driven load balancing for processing jobs using an appropriate system, such as the system described in FIG. 1.
Figure 3:
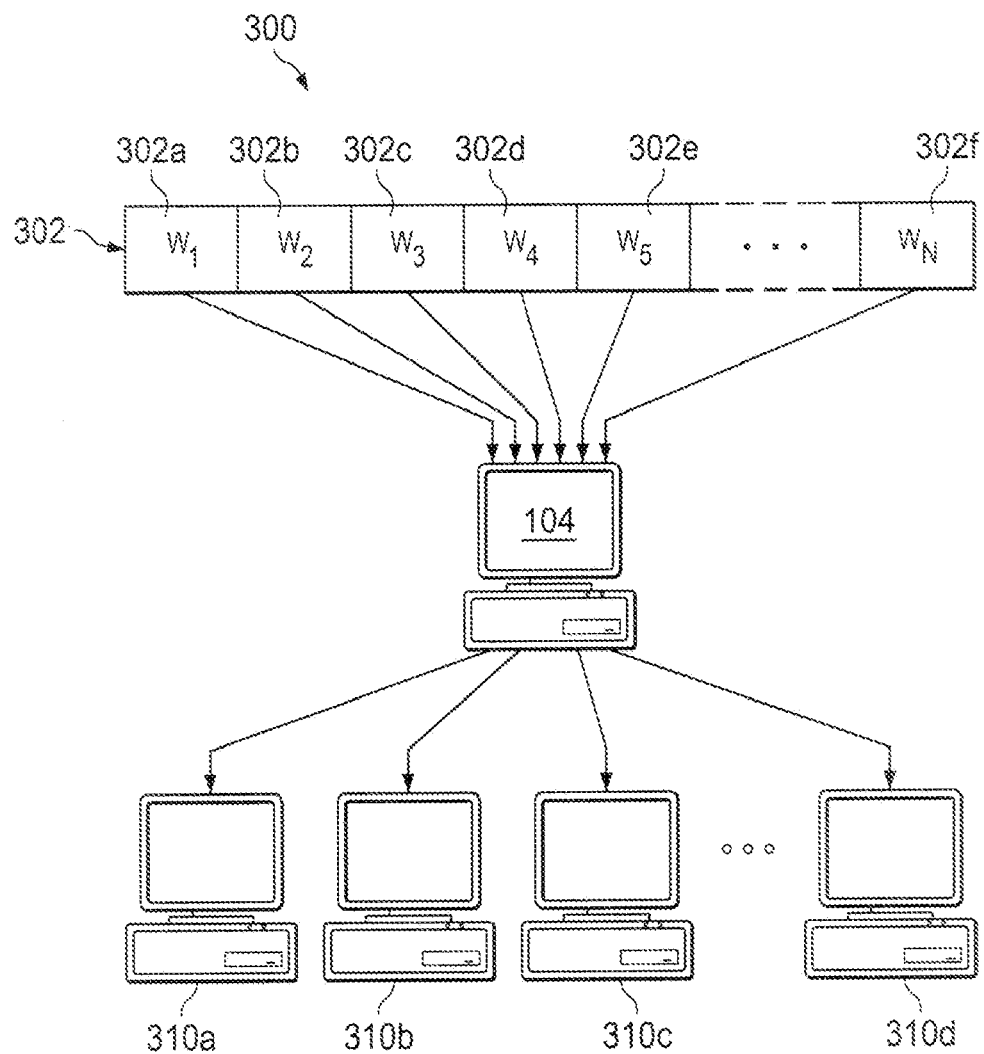
FIG. 3 is an example environment of an adaptive demand-driven load balancing implementation using an appropriate system, such as the system described in FIG. 1.

FIG. 2 is a flow chart illustrating a process 200 of providing adaptive demand-driven load balancing for processing jobs in business applications. First, a workload for distribution among a plurality of work processes is identified at 202. FIG. 3 illustrates an example environment 300 for implementing the adaptive demand-driven load balancing described in FIG. 2. As illustrated in FIG. 3, a work process 310 may be any computer program, computer processor, server, workstation, instance of a computer program, thread of execution within a computer program, or other data processing element used to process a work item such as a batch job. The workload 302 may be identified by a load balancer 104 after it is received by the load balancer 104 from a business application. In particular, some business applications may require processing of large amounts of data 302 and may transmit the data 302 to a centralized load balancer 104 for distribution among multiple work processes 310 as depicted in FIG. 3. In some implementations, the workload 302 may be associated with a batch process and may consist of a plurality of batch jobs that have accumulated over a period of time for processing at a particular time.

A subset of the workload may then be assigned to a plurality of work processes 310 based on an application-dependent algorithm at 204. The workload 302 may consist of multiple work items, for example, with each work item being a particular job or data object to be processed. In some instances, the work items may be grouped into work packages 302a-f comprising one or more work items, with each work package 302a-f assigned to a different work process 310a-d as seen in FIG. 3. Rather than assign all work items in the workload to the available work processes, the load balancer 104 may assign only a subset of the workload to the work processes 310. In other words, only a fraction of the total number of work items identified at 202 as being available for load balancing distribution is initially assigned to work processes. Accordingly, the remaining portion of the workload 302 may be assigned to the work processes 310 in subsequent iterations as the work processes 310 complete their tasks. Thus, the load balancer 104 is provided with the opportunity to adapt to the particular differences in processing times required for different work items by assigning additional work items to work processes that complete processing sooner than others.

Figure 4:
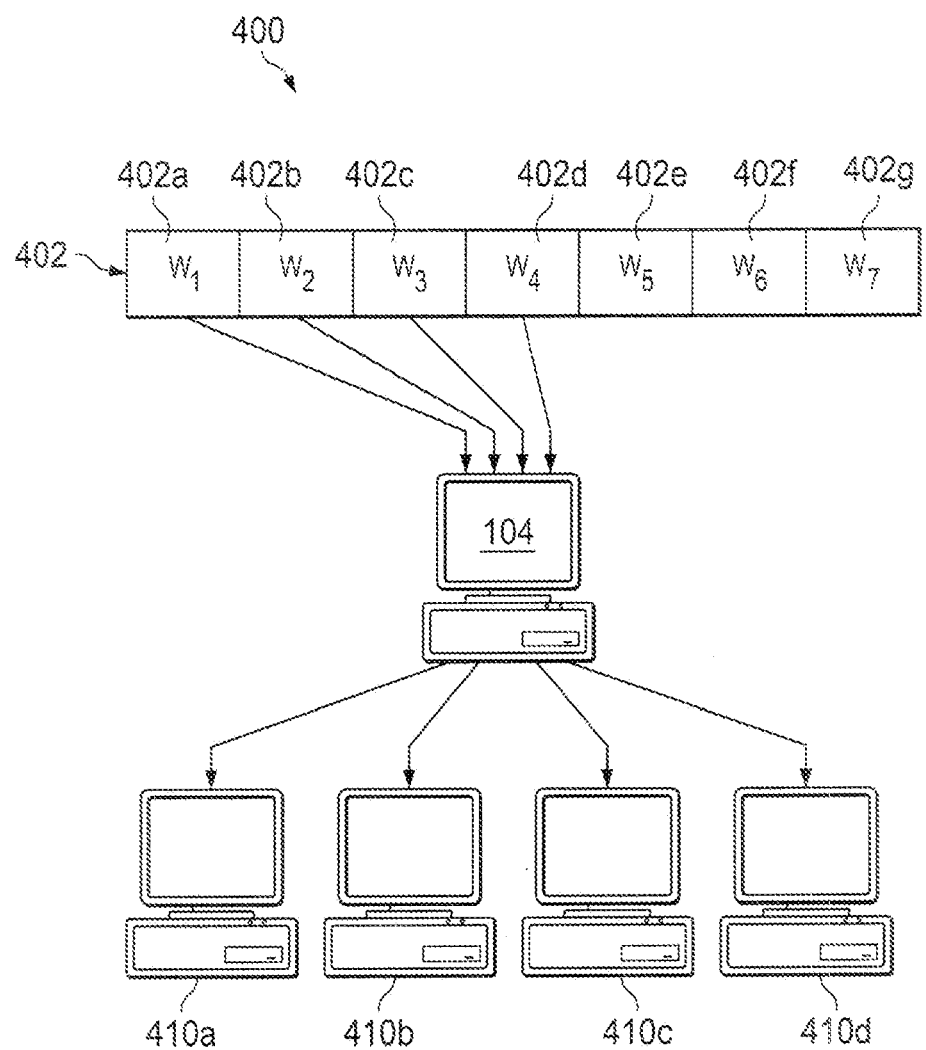
FIG. 4 is an example environment of an adaptive demand-driven load balancing implementation using an application-dependent algorithm and an appropriate system, such as the system described in FIG. 1.

The relative size of the subset with respect to the entire workload size or how many work items are initially assigned to each work process may be determined based in part on an application-dependent algorithm 128. In some implementations, the application-dependent algorithm 128 may be an algorithm specifically designed for a particular business application and incorporates parameters 124 reflecting processing attributes of work items associated with the particular business application. The application-dependent algorithm 128 may be used, for example, to efficiently assign an appropriate number of work items to available work processes to minimize idle times experienced by the work processes during processing of the workload. The description provided below in connection with FIG. 4 is one example of an application-dependent algorithm 128 that may be implemented in a load balancing process such as the process 200 depicted in FIG. 2.

After the subset of the workload has been assigned to the available work processes 310, the work items in the subset are transmitted to the work processes 310 for processing. In some instances, a particular work process may complete processing before other work processes. An indication of availability may be received from a particular work process that has completed processing of assigned work items at 206, indicating that the work process is available for further assignments of work items. The load balancer 104 may then assign a new subset of the workload 302 to the available work process at 208 if there are remaining portions of the workload to be processed. The new subset of the workload may comprise the remaining portion of the workload or only a portion of the remaining workload, depending on the situation. For example, the new subset of the workload may comprise a particular number of work items to be assigned to the available work process based on the application-dependent algorithm 128 as determined during the first iteration at 202, or the application-dependent algorithm 128 may be performed again to determine the appropriate number of work items (or work package) to provide to the available work process. Alternatively, the application-dependent algorithm 128 may be dynamically updated with additional statistical information, such as with results from the current load balancing process, before applying the algorithm 128 to assign work items to the available work process. In some instances, an entirely new algorithm may be applied to determine the work items assigned to the available work process. In other words, the load balancer 104 may dynamically adapt to the current situation in view of the processing of work items during the first iteration to assign work items to maximize utilization of available work processes. Further, any other process or algorithm may be used to assign the remaining work items from the workload to the work processes 310.

As described above, work items may be assigned to work processes based on an application-dependent algorithm 128 that maximizes utilization of available work processes. For example, the application-dependent algorithm 128 may need to account for possible differences in complexity among the different work items in the workload. FIG. 4 depicts a load balancing environment 400 associated with the following description of an example application-dependent algorithm 128. One method for factoring in differences in complexity may be to estimate a maximum deviation between the average processing time of a work item in a workload and the maximum processing time of a work item in the workload. In this instance, the estimated processing time of a work item can be used as a proxy for estimated complexity of the work item. The estimate of processing times for work items in a particular workload can be based on empirical data reflecting average processing times associated with the type of work items or any number of other factors, such as the type of business application associated with the workload, the business context associated with the workload, the type of work processes available, or the likelihood of work items with certain levels of complexity.

In some implementations, an estimate of processing times for work items in a particular workload can be represented in an empirical parameter 124, such as a ratio of the estimated maximum possible processing time for any given work item to another equally-sized work item in the same workload. Thus, for any two equally sized work items in a processing job, the value of the empirical parameter 124 represents an assumption that the time for processing one work item divided by the time for processing a second work item will be less than the empirical parameter 124. In other words, the empirical parameter 124 is a domain-specific value representing an upper bound or maximum value of the possible deviation of processing times between two work items. The processing times may be estimated based on statistical analysis of a history of processing times associated with similar work items or processing jobs associated with the business application. In some instances, the statistical analysis considers only the performance of particular systems and does not analyze the content of the work items. If no statistical data is available for a particular processing job, the adaptive load balancing module 104 may provide a test parameter during a first iteration of the load balancing based on similar types of processing jobs. The test parameter may then be modified as additional processing data is obtained over time.

In addition, the load balancing module 104 may vary the number or size of work items assigned to each work process depending on the amount of empirical evidence available for generating the empirical parameter 124. For example, if a large performance history is available for a certain process, the empirical parameter 124 may be generated with the assurance that future processing times of work items associated with the same process will likely adhere to the estimated processing times reflected in empirical parameter 124. If, however, there is little empirical evidence available for generating the empirical parameter 124, there is less assurance that the empirical parameter 124 generated for the application-dependent algorithm 128 will accurately predict the estimated deviations in processing times. Accordingly, if there is relatively little statistical data available for a particular process, the load balancing module 104 may initially assign fewer work items to the work processes to minimize the effect of potential errors in the empirical parameter 124. Assigning smaller processing jobs to the work processes may also result in faster turnaround times for the work processes, resulting in additional statistical data that may be used to immediately update the empirical parameter 124 so that the next iteration of assigning work items may be conducted with more information. In contrast, if a large store of statistical data exists with respect to a particular process, the load balancing module 104 may assign more work items to the work processes with the assurance that the processing times will more accurately reflect the historical data. Further, this empirical parameter 124 may be one of many different mechanisms for estimating possible processing times for each work item, and other mathematical or statistics-based representations are within the scope of the present disclosure.

The empirical parameter 124 can be used in the application-dependent algorithm 128, such as the example algorithm described below. The application-dependent algorithm 128, for example, may provide the size of a first subset of an overall workload or an estimate of the number of work items to assign to each available work process in a first iteration. In certain implementations, the parameters of the application-dependent algorithm 128 may include the number of available work processes during the first iteration of work item distribution, the total workload size or the total number of work items to be distributed for job processing, and the empirical parameter 124 described above. In the present example, a subset of the overall workload is distributed to the available work processes. As illustrated in FIG. 4, the subset is further subdivided into work packages 402*a-d*, each work package assigned to a different work process 410*a-d* and consisting of a number of work items. The application-dependent algorithm 128 first calculates a ratio of the overall workload that yields the number of work items to be assigned to each work process 410 in the first iteration of the load balancing. The algorithm 128 of the present example contemplates an equal number of work items to be distributed to each work process 410, but a different number of work items may be assigned to each work process in some implementations. The ratio may be represented as the following fraction, where T represents the empirical parameter 124 and N represents the number of work processes available to the load balancer 104:

$$\text{Ratio} = 1/(1+T(N-1))$$

The fraction above may be applied to a total number of work items in the overall workload to determine how many work items should be assigned to each work process 410 in a first iteration. Accordingly, if the total number of work items in the workload is C, the number of work items assigned to each work process 410 is determined by multiplying the Ratio defined above with the number of total work items C:

$$\text{Work Items} = C*(1/(1+T(N-1)))$$

As an example, a particular load balancing arrangement may have a total workload 402 of C=28 work items to be processed by N=4 work processes. Based on empirical data obtained for the particular business application or business context associated with the work items, for example, an empirical parameter T may be defined for the scenario with a value of T=2. In this instance, a value of T=2 would mean that a particular work item may have a processing time that is, at most, twice the processing time of another work item. Thus, the number of work items assigned to each work process 410 in a first iteration as determined by the application-dependent algorithm 128 would be 4 work items, as illustrated using the example algorithm described above:

$$\text{Work Items} = 28*(1/(1+2(4-1))) = 4$$

In the present example, the application-dependent algorithm 128 is designed to minimize idle times among processors in a load balancing scenario. Accordingly, given an empirically-determined parameter 124 approximating the maximum deviation in processing times for work items, the application-dependent algorithm 128 estimates a number of work items to assign to each work process 410 that will minimize idle times of the work processes 410. This can be illustrated using the following example.

As described above, the application-dependent algorithm 128 in this example has determined that based on the statistical data available (represented in the empirical parameter T), each work process 410 should be assigned 4 work items at a time in order to minimize idle times in the available work processes 410. Since there are 28 total work items in the workload 402, the workload can be divided into 7 separate work packages 402a-g as illustrated in FIG. 4, each work package consisting of 4 work items to be assigned to a different work process 410. If the first work package $W_1$ 402a, for example, requires an estimated 10 seconds to process, the other remaining work packages 402b-g may each require an estimated 5 seconds to process since the empirical parameter T represents the maximum deviation in processing times for two different work times, and in this instance, the value of T is 2. Accordingly, under the assumption that $W_1$ 402a will require 10 seconds to process, the other work packages 402b-g each require half the time to process.

If work package $W_1$ 402a is assigned to work process 410a, the remaining work processes 410b-d may be assigned work packages $W_2$ 402b, $W_3$ 402c, and $W_4$ 402d respectively. Work processes 410b-d will then finish processing their assigned work packages 402b-d after 5 seconds if the assumptions of the application-dependent algorithm 128 are true, and the remaining work packages $W_5$ 402e, $W_6$ 402f, and $W_7$ 402g are subsequently assigned to the work processes 410b-d that have completed processing the work packages 402b-d assigned during the first iteration once the respective work processes notify the load balancer of their availability. Accordingly, after 10 seconds have elapsed, each work process 410a-d has completed processing its assigned work package(s) with zero idle time. Work process 410a has processed work package $W_1$ 402a, which required 10 seconds, while work processes 410b-d have each processed two work packages requiring 5 seconds each. Thus, as illustrated in the present example, the application-dependent algorithm 128 may determine a number of work items to assign to each work process 410 such that the work processes 410 are utilized with minimal idle time despite possible differences in work item complexity.

The example described above is for illustration purposes, and other types of algorithms 128 may be implemented to maximize efficiency in assigning work items for load balancing. For example, algorithms 128 can be defined to account for the possibility of work items with more than two degrees of complexity, work items of unequal sizes, work processes with varying degrees of processing capabilities, whether the load balancing module 104 is implemented in a shared or dedicated environment, or other possible scenarios in a particular business application context. A weighted algorithm 128 may be defined, for example, to reflect different processing capabilities of different work processes. Further, particular algorithms 128 may be predefined for particular scenarios involving different business applications or business contexts. For example, the load balancing module 104 may use a particular algorithm 128 designed to maximize efficiency for print jobs each time a print job is initiated by any business application. The "print job" algorithm 128 may be defined based on statistical patterns associated with previous print jobs. Other types of algorithms 128 may be specifically defined for other types of processing jobs such as reporting jobs, accounting tasks, and the like. In other words, the load balancing module 104 may select from a variety of application-dependent algorithms 128 depending on the type of processing job being executed. The particular application-dependent algorithm 128 for a particular processing job may also be selected based on the type of the workload, the number of work processes available to the load balancing module 104, the business context of the workload, the types of work processes available, or any other suitable factor.

The preceding figures and accompanying description illustrate example processes and computer implementable techniques. But environment 100 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the steps in these processes may take place simultaneously and/or in different orders than as shown. Moreover, environment 100 may use processes with additional steps, fewer steps, and/or different steps, so long as the methods remain appropriate. For example, a load balancing scheduler may be implemented in connection with or internal to load balancing module 104. The load balancing scheduler may perform tasks for facilitating an overall load balancing process such as determining when additional processors are needed or the priority of work item assignments. A load monitor may also be implemented to monitor the different processors used by load balancing module 104.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A computer implemented method performed by one or more processors for balancing a workload, the method comprising the following operations:
   receive a workload comprising a plurality of work items for processing;
   identify a subset of a plurality of work items;
   assign one or more work items of the subset to each of a plurality of work packages based on an amount of empirical evidence available for generating an empirical parameter associated with the workload, the empirical parameter indicating an estimated processing time for work items in the workload, the estimated processing time based on an application dependent algorithm and used as a proxy for estimating a complexity of each work item of the one or more work items;
   assign each work package to a different work process of a plurality of work processes for processing based on the application dependent algorithm;
   receive an indication of availability from a particular one of the plurality of work processes that has completed processing of a particular work package assigned to the particular work process;
   update the empirical parameter associated with the workload based on the processing of the particular work package to produce an updated empirical parameter; and
   assign a new subset of the remaining work items comprising the workload to the particular one of the plurality of work processes in response to receiving the indication of availability, the indication of availability based on the application independent algorithm and the updated empirical parameter.

2. The method of claim 1, wherein each work process is a computer processor or a server.

3. The method of claim 1, wherein each work package is divided into a particular size based on the empirical parameter.

4. The method of claim 1, wherein each work package is further assigned to a work process based on a dynamically determined priority of particular work packages.

5. The method of claim 1, wherein the application-dependent algorithm is selected based on at least one of a type of the workload, a number of work processes in the plurality of work processes, a business context of the workload, or a type of the work processes in the plurality of work processes.

6. The method of claim 1, wherein the new subset of the workload is assigned based on a different application-dependent algorithm.

7. The method of claim 1, wherein the application-dependent algorithm is based on parameters including at least one of an estimate of a maximum deviation of processing times for two different work items from the workload, a number of work processes in the plurality of work processes, or a number of work items in the workload.

8. The method of claim 7, wherein the estimate of a maximum deviation of processing times for two different work items from the workload is determined based on historical data of processing times associated with work items similar to the work items in the workload.

9. The method of claim 8, wherein the subset of the workload is further assigned based on an amount of the historical data of processing times associated with work items similar to the work items in the workload.

10. The method of claim 1, wherein the subset of the workload is assigned without analyzing a content of the subset of the workload.

11. The method of claim 1, wherein the work packages are equal in size.

12. The method of claim 1, further comprising:
   identifying a plurality of additional work processes available for processing the workload; and
   assigning a second subset of the workload to the plurality of additional work processes.

13. The method of claim 1, further comprising:
   determining whether the empirical parameter is set to a test value to indicate a lack of sufficient available data to estimate processing times for the work items; and
   dividing the workload into a greater number of work packages in order to generate sufficient data to estimate processing times for the work items upon determination that the empirical parameter is set to the test value.

14. The method of claim 1, wherein the empirical parameter is associated with a particular business application.

15. A computer program product encoded on a tangible, non-transitory storage medium, the product comprising computer readable instructions for causing one or more processors to perform operations comprising:
   receiving a workload comprising a plurality of work items for processing;
   identifying a subset of a plurality of work items;
   assigning one or more work items of the subset to each of a plurality of work packages based on an amount of empirical evidence available for generating an empirical parameter associated with the workload, the empirical parameter indicating an estimated processing time for work items in the workload, the estimated processing time based on an application dependent algorithm and used as a proxy for estimating a complexity of each work item of the one or more work items;
   assigning each work package to a different work process of a plurality of work processes for processing based on the application dependent algorithm;
   receiving an indication of availability from a particular one of the plurality of work processes that has completed processing of a particular work package assigned to the particular work process;
   updating the empirical parameter associated with the workload based on the processing of the particular work package to produce an updated empirical parameter; and
   assigning a new subset of the remaining work items comprising the workload to the particular one of the plurality of work processes in response to receiving the indication of availability, the indication of availability based on the application independent algorithm and the updated empirical parameter.

16. The computer program product of claim 15, wherein the new subset of the remaining work items is assigned based on a different application-dependent algorithm.

17. The computer program product of claim 15, wherein the application-dependent algorithm is based on parameters including at least one of an estimate of a maximum deviation of processing times for two different work items from the workload, a number of work processes in the plurality of work processes, or a number of work items in the workload.

18. The computer program product of claim 17, wherein the estimate of a maximum deviation of processing times for two different work items from the workload is determined based on historical data of processing times associated with work items similar to the work items in the workload.

19. The computer program product of claim 18, wherein the portion of the plurality of work packages is assigned based at least in part on an amount of the historical data of processing times associated with work items similar to the work items in the workload.

20. A system, comprising:
memory operable to store information associated with an application-dependent algorithm for load balancing; and
one or more processors operable to:
receive a workload comprising a plurality of work items for processing;
identify a subset of a plurality of work items;
assign one or more work items of the subset to each of a plurality of work packages based on an amount of empirical evidence available for generating an empirical parameter associated with the workload, the empirical parameter indicating an estimated processing time for work items in the workload, the estimated processing time based on an application dependent algorithm and used as a proxy for estimating a complexity of each work item of the one or more work items;
assign each work package to a different work process of a plurality of work processes for processing based on the application dependent algorithm;
receive an indication of availability from a particular one of the plurality of work processes that has completed processing of a particular work package assigned to the particular work process;
update the empirical parameter associated with the workload based on the processing of the particular work package to produce an updated empirical parameter; and
assign a new subset of the remaining work items comprising the workload to the particular one of the plurality of work processes in response to receiving the indication of availability, the indication of availability based on the application independent algorithm and the updated empirical parameter.

21. The system of claim 20, wherein the application-dependent algorithm is based on parameters including at least one of an estimate of a maximum deviation of processing times for two different work items from the workload, a number of work processes in the plurality of work processes, or a number of work items in the workload.

22. The system of claim 21, wherein the estimate of a maximum deviation of processing times for two different work items from the workload is determined based on historical data of processing times associated with work items similar to the work items in the workload.

23. The system of claim 20, wherein the work packages are assigned without analyzing a content of the workload.

* * * * *